United States Patent [19]

Dornhagen et al.

[11] Patent Number: 5,444,163
[45] Date of Patent: Aug. 22, 1995

[54] PREPARATION OF REACTIVE PHTHALOCYANINE DYES

[75] Inventors: Juergen Dornhagen, Limburgerhof; Manfred Patsch, Wachenheim, all of Germany

[73] Assignee: BASF Aktiengesellschaft, Ludwigshafen, Germany

[21] Appl. No.: 151,174

[22] Filed: Nov. 12, 1993

[30] Foreign Application Priority Data

Nov. 11, 1992 [DE] Germany ............ 42 38 047.2

[51] Int. Cl.$^6$ ............................................. C09B 47/04
[52] U.S. Cl. ................................. 540/133; 540/131; 540/134; 540/123; 540/125; 8/661
[58] Field of Search ............... 540/125, 133, 131, 134

[56] References Cited

U.S. PATENT DOCUMENTS

| | | | |
|---|---|---|---|
| 4,576,755 | 3/1986 | Mischke et al. | 8/661 |
| 4,952,688 | 8/1990 | Springer | 540/134 |
| 5,279,622 | 1/1994 | Stawitz et al. | 540/125 |

FOREIGN PATENT DOCUMENTS

| | | |
|---|---|---|
| 0074837 | 3/1983 | European Pat. Off. . |
| 231837 | 6/1987 | European Pat. Off. . |
| 0304751 | 3/1989 | European Pat. Off. . |
| 2427365 | 12/1979 | France . |
| 2824211 | 12/1979 | Germany . |
| 2906442 | 8/1980 | Germany . |

OTHER PUBLICATIONS

Loudon, Organic Chemistry., p. 1267, Addison–Wesley Publishing Company., 1984.

*Primary Examiner*—Mukund J. Shah
*Assistant Examiner*—Pavanaram K. Sripada
*Attorney, Agent, or Firm*—Oblon, Spivak, McClelland, Maier & Neustadt

[57] ABSTRACT

There is described a process for preparing reactive phthalocyanine dyes with β-substituted ethylsulfonyl or vinylsulfonyl groups by reacting a phthalocyaninesulfonyl chloride with amines with β-substituted ethylsulfonyl or vinylsulfonyl groups with or without further amines in the presence of a heterocyclic catalyst.

4 Claims, No Drawings

PREPARATION OF REACTIVE PHTHALOCYANINE DYES

The present invention relates to a novel process for preparing reactive phthalocyanine dyes with β-substituted ethylsulfonyl groups or vinylsulfonyl groups by reacting a phthalocyaninesulfonyl chloride with amines having β-substituted ethylsulfonyl groups or vinylsulfonyl groups and with or without further amines in the presence of a catalyst.

The reaction of phthalocyaninesulfonyl chlorides with amines that carry reactive groups in the presence of specific pyridinecarboxylic or pyridinesulfonic acids as catalysts is known from DE-A-2 824 211 or DE-A-2 906 442. Furthermore, EP-A-231 837 describes the use of pyridinecarboxamides or pyridinesulfonamides as catalysts for this purpose.

It is an object of the present invention to provide a novel process for preparing reactive phthalocyanine dyes by reacting phthalocyaninesulfonyl chlorides in an advantageous manner with amines which carry reactive groups. The target products shall be obtained in high yield and purity.

We have found that this object is achieved in an advantageous manner by a process for preparing reactive metal-free or metal-containing phthalocyanine dyes with one or more ethylsulfonyl groups substituted in the β-position by an alkali-detachable radical or vinylsulfonyl groups as the reactive groups by reacting a metal-free or metal-containing phthalocyaninesulfonyl chloride with primary or secondary amines having one or more ethylsulfonyl groups substituted in the β-position by an alkali-detachable radical or vinylsulfonyl groups and with or without further primary or secondary amines of the aliphatic, aromatic or heterocyclic series in the presence of a catalyst, which comprises carrying out the reaction in the presence of a catalyst comprising a heterocycle selected from the group consisting of 1-($C_1$–$C_4$-alkyl)imidazoles in which the alkyl group may be $C_1$–$C_4$-alkoxy-substituted, 1-carboxymethylimidazole, 1,2-dimethylimidazole, 1-methylimidazole-5-carboxylic acid, 1-carboxymethyl-1,3,4-triazole, 4-($C_1$–$C_4$-dialkylamino)pyridine, 4-(pyrrolidin-1-yl)piperidine, 4-(piperidin-1-yl)pyridine, 4-(morpholin-4-yl)pyridine, 4-(piperazin-1-yl)pyridine, 4-[4-($C_1$–$C_4$-alkyl)piperazin-1-yl]pyridine and dimethyltetrazole.

As well as the specific heterocycles already mentioned, suitable heterocycles further include for example 1-methylimidazole, 1-ethylimidazole, 1-propylimidazole, 1-isopropylimidazole, 1-butylimidazole, 1-isobutylimidazole, 1-sec-butylimidazole, 1-(2-methoxyethyl)imidazole, 1-(2-ethoxyethyl)imidazole, 1-(2-propoxyethyl)imidazole, 1-(2-isopropoxyethyl)imidazole, 1-(2-butoxyethyl)imidazole, 1-(2-methoxypropyl)imidazole, 1-(3-methoxypropyl)imidazole, 1-(2-ethoxypropyl)imidazole, 1-(3-ethoxypropyl)imidazole, 1-(2-methoxybutyl)imidazole, 1-(4-methoxybutyl)imidazole, 1-(2-ethoxybutyl)imidazole, 1-(4-ethoxybutyl)imidazole, 4-dimethylaminopyridine 4-diethylaminopyridine, 4-(4-methylpiperazin-1-yl)pyridine and 4-(4-ethylpiperazin-1-yl)pyridine.

The process of the invention is preferably carried out in the presence of a 1-($C_1$–$C_4$-alkyl)imidazole.

The reactive phthalocyanine dyes of the process of the invention are metal-free or metal-containing phthalocyanines. Metal-containing phthalocyanines include in particular copper, cobalt or nickel phthalocyanines. The preparation of reactive copper phthalocyanine dyes is preferred.

Preference is further given to a process for preparing reactive phthalocyanine dyes of the formula I

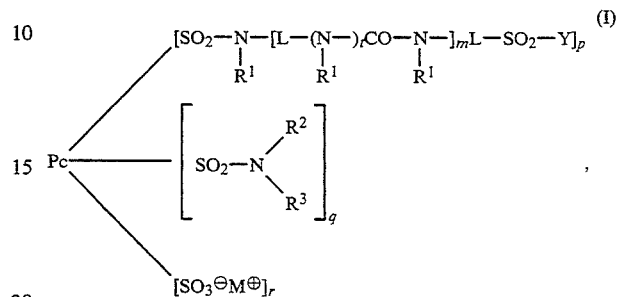

where

Pc is the radical of a metal-free or metal-containing phthalocyanine system which may be substituted by chlorine or phenyl, $R^1$ is hydrogen or $C_1$–$C_6$-alkyl, $R^2$ and $R^3$ are singly and independently of each other hydrogen, $C_1$–$C_6$-alkyl, which may be interrupted by 1 or 2 oxygen atoms in ether function, or phenyl, or together, combined with the nitrogen atom joining them together, a five- or six-membered saturated heterocyclic radical which may contain further hetero atoms, L is $C_2$–$C_4$-alkylene, which may be interrupted by an oxygen atom in ether function, naphthylene or a radical of the formula

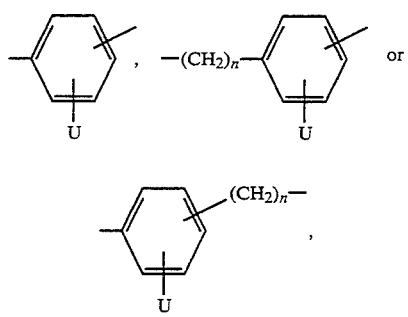

where

U is hydrogen, hydroxysulfonylmethyl or hydroxysulfonyl and n is 1 or 2,

Y is vinyl or a radical of the formula $C_2H_4$—Q, where Q is an alkali-detachable group, M• is the equivalent of a cation, m is 0 or 1, p is from 1 to 3, q is from 0 to 3, r is from 1 to 3, and t is 0 or 1, with the proviso that the sum of p, q and r is not more than 4, wherein a phthalocyaninesulfonyl chloride of the formula II

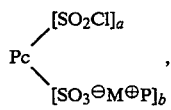     (II)

where Pc and M• are each as defined above, a is from 1 to 4 and b is from 0 to 3, with the proviso that the sum of a and b is not more than 4, or a mixture of phthalocyaninesulfonyl chlorides of the formula II is reacted in an aqueous medium with an amine of the formula III

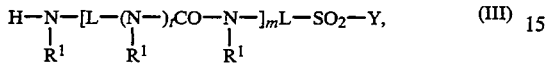  (III)

where $R^1$, L, Y, m and t are each as defined above, and with or without an amine of the formula IV

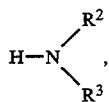  (IV)

where $R^2$ and $R^3$ are each as defined above, the order of reaction with the amines III and IV being freely choosable in the presence of one of the abovementioned heterocycles as a catalyst.

$R^1$, $R^2$ and $R^3$ are each for example methyl, ethyl, propyl, isopropyl, butyl, isobutyl, sec-butyl, pentyl, isopentyl, neopentyl, tert-pentyl, hexyl or 2-methylpentyl.

$R^2$ and $R^3$ may each also be for example 2-methoxyethyl, 2-ethoxyethyl, 2-propoxyethyl, 2-isopropoxyethyl, 2-butoxyethyl, 2- or 3-methoxypropyl, 2- or 3-ethoxypropyl, 2- or 4-methoxybutyl, 2- or 4-ethoxybutyl, 3,6-dioxaheptyl or 3,6-dioxaoctyl.

$R^2$ and $R^3$ combined with the nitrogen atom joining them together to form a five- or six-membered saturated heterocyclic radical which may contain further hetero atoms can be for example pyrrolidinyl, piperidinyl, morpholinyl, piperazinyl or N-($C_1$-$C_4$-alkyl)piperazinyl.

L is for example $(CH_2)_2$, $(CH_2)_3$, $(CH_2)_4$, $CH(CH_3)CH_2$, $CH(CH_3)CH(CH_3)$, $(CH_2)_2O(CH_2)_2$, phenylene, hydroxysulfonylmethylphenylene, hydroxysulfonylphenylene, naphthylene or phenylenemethylene.

M• is the equivalent of a cation. It is either a proton or derived from metal or ammonium ions. Metal ions are in particular the lithium, sodium or potassium ions. Ammonium ions are for the purposes of the present invention substituted or unsubstituted ammonium cations. Substituted ammonium cations are for example monoalkyl-, dialkyl-, trialkyl-, tetraalkyl- or benzyltrialkyl-ammonium cations or cations derived from nitrogen-containing five- or six-membered saturated heterocycles, such as pyrrolidinium, piperidinium, morpholinium, piperazinium or N-alkylpiperazinium cations or their N-monoalkyl- or N,N-dialkyl-substituted products. Alkyl is here to be understood as meaning in general straight-chain or branched $C_1$-$C_{20}$-alkyl, which may be substituted by hydroxyl groups and/or interrupted by oxygen atoms in ether function. The ammonium ion can also be derived from the heterocycles mentioned at the beginning.

Particularly suitable cations are protons and lithium, sodium and potassium ions.

Q is an alkali-detachable group. Examples of groups of this kind are chlorine, bromine, $C_1$-$C_4$-alkylsulfonyl, phenylsulfonyl, $OSO_3H$, $SSO_3H$, $OP(O)(OH)_2$, $C_1$-$C_4$-alkylsulfonyloxy, phenylsulfonyloxy, $C_1$-$C_4$-alkanoyloxy, $C_1$-$C_4$-dialkylamino or a radical of the formula

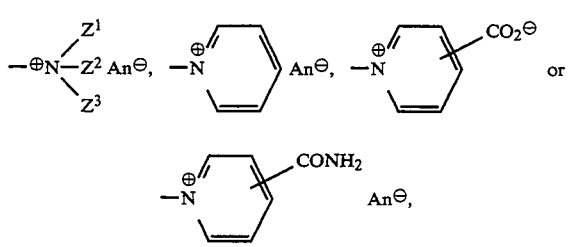

where $Z^1$, $Z^2$ and $Z^3$ are identical or different and are each independently of the others $C_1$-$C_4$-alkyl or benzyl and $An^\ominus$ is in each case one equivalent of an anion. Suitable anions for this purpose are for example fluoride, chloride, bromide, iodide, mono-, di- or trichloroacetate, methanesulfonate, benzenesulfonate and 2- or 4-methylbenzenesulfonate.

Attention is drawn in particular to the preparation of reactive phthalocyanine dyes of the formula I where
 Pc is the radical of a copper phthalocyanine system which is not further substituted,
 $R^1$ is hydrogen or $C_1$-$C_4$-alkyl,
 $R^2$ and $R^3$ are independently of each other hydrogen or $C_1$-$C_4$-alkyl, which may be interrupted by an oxygen atom in ether function,
 L is $C_2$-$C_3$-alkylene, phenylene or phenylenemethylene,
 m and t are each 0, and y, M•, p, q and r are each as defined above.

Of particular suitability is the preparation of reactive phthalocyanine dyes of the formula I where m is 0, p is from 1.3 to 2.5 and q is 0.

Also of particular suitability is the preparation of reactive phthalocyanine dyes of the formula I where m is 0, $R^1$ is hydrogen and L is phenylene.

Of particular suitability is further the preparation of reactive phthalocyanine dyes of the formula I where q is 0.

Of particular suitability is further the preparation of reactive phthalocyanine dyes of the formula I where Y is vinyl, 2-sulfatoethyl or 2-thiosulfatoethyl.

The reactive phthalocyanine dyes preparable according to the invention, for example the dyes of the formula I, are in general obtained in the form of mixtures of the individual compounds, for example the individual compounds of the formula I, which individual compounds differ by the degree of substitution of the hydroxysulfonyl groups and sulfonamide groups on the phthalocyanine radical—in terms of the formula I by the degree of substitution of the radicals bearing the indices p, q and r. Referring to the example of the formula I, therefore, the indices p, q and r of the reactive phthalocyanine dye obtained are in general fractions.

The process of the invention is advantageously carried out in an aqueous medium at a pH of from 3.5 to 8.5, preferably from 4 to 8, in particular from 5 to 7, in the presence of an acid-binding agent.

The process of the invention can be carried out at from 0° to 60° C. With preference it is carried out at from 10° to 35° C.

Acid-binding agents used in the process of the invention include for example hydroxides, carbonates or bicarbonates, secondary or tertiary phosphates, borates or acetates of the metals of groups I to III of the periodic table, preferably the sodium and potassium compounds or else calcium compounds.

To improve the solubility of the starting materials or end products in the aqueous reaction medium it is possible, if desired, to add organic solvents, preferably amides of aliphatic carboxylic acids, such as N,N-dimethylformamide, N,N-dimethylacetamide, N-methylpyrrolidinone or 1,3-dimethyltetrahydropyrimid-2-one.

The amounts used per mole of phthalocyaninesulfonyl chloride are in general from 1 to 8 mol, preferably from 1.5 to 4 mol, of an amine with the reactive group and from 0 to 4 mol, preferably from 0 to 2 mol, of the "non-reactive amine".

The catalyst heterocycles are used in an amount of from 0.1 to 1 mol %, preferably from 0.1 to 0.5 mol %, each mole percentage being based on the phthalocyaninesulfonyl chloride.

The process of the invention is advantageously carried out by suspending the phthalocyaninesulfonyl chloride in water in the presence or absence of auxiliaries such as dispersants or antifoams and adding to it, under the abovementioned reaction conditions, the catalyst, the amine with the reactive group and, optionally, the "non-reactive" amine. After the reaction has ended, which in general takes from 6 to 8 hours, the reactive dye can be isolated from the resulting reaction solution, for example by spray drying or salting out, for example with sodium chloride or potassium chloride.

However, it is also possible to use the resulting dye solution directly, without further isolation of the dye which has been formed, and after appropriate standardization and, if appropriate, the further addition of buffer substances, as a liquid formulation for dyeing or printing fiber materials.

The process of the invention can be modified by converting some of the sulfonyl chloride groups of the phthalocyaninesulfonyl chloride, for example of the formula II, into hydroxysulfonyl groups by hydrolysis before, during or after the actual condensation reaction. The condensation can be carried out for example by hydrolyzing some of the sulfonyl chloride groups simultaneously with the reaction with the amines, for example with the amine III and/or IV. It is also possible first to react with an amount of amine, for example the amine of the formula III and/or IV, which is not sufficient to convert all the sulfonyl chloride groups and then to hydrolyze the remaining sulfonyl chloride groups in a separate reaction step in an acid to weakly alkaline medium, for example at a pH of from 1 to 8, with or without heating, for example at from 20° to 60° C.

The novel process provides the target products in high yield and purity.

The reactive phthalocyanine dyes preparable by means of the process of the invention are useful for dyeing or printing hydroxyl- or nitrogen-containing organic substrates. These substrates are for example leather or fiber material which contains predominantly natural or synthetic polyamides or natural or regenerated cellulose. They are preferably useful for dyeing and printing textile material based on wool or in particular on cotton. The dyeings obtained have greenish blue shades.

Embodiments of the invention will now be more particularly described by way of example

EXAMPLE 1

0.4 mol of copper phthalocyaninesulfonyl chloride (containing about 3.8 sulfonyl chloride groups) was suspended as a moist press cake in 1000 ml of water in the presence of a dispersant. 450 g (1.6 mol) of 4-(2-sulfatoethylsulfonyl)aniline and 3.3 g (0.04 mol) of 1-methylimidazole were added. The pH was maintained at from 6.2 to 6.5 at about 25° C. with solid sodium bicarbonate. The end of the reaction came after 7 h. The dye was isolated from the clear blue solution by salting out with potassium chloride. The structure (in the form of the free acid) was determined—as in the other examples too—by the method described in Example 1 of U.S. Pat. No. 4,576,755, and was found to be approximately as follows:

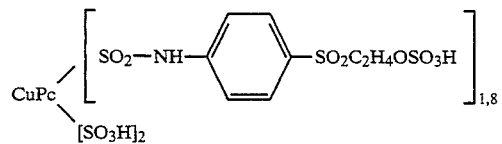

EXAMPLE 2

0.1 mol of copper phthalocyaninesulfonyl chloride (containing about 3.8 sulfonyl chloride groups) in the form of a moist press cake was suspended in 100 ml of water in the presence of a dispersant. 112 g (0.4 mol) of 4-(2-sulfatoethylsulfonyl)aniline and 4.1 g (0.05 mol) of 1-methylimidazole were added. The pH was maintained at from 6.2 to 6.5 at about 25° C. with solid sodium bicarbonate. The end of the reaction came after 7 h. The dye was isolated from the clear blue solution by spray drying. The structure (in the form of the free acid) was found to be approximately as follows:

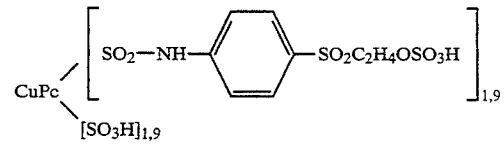

EXAMPLE 3

0.2 mol of copper phthalocyaninesulfonyl chloride (containing about 3.8 sulfonyl chloride groups) in the form of a moist press cake was suspended in 500 ml of water in the presence of a dispersant. 169 g (0.6 mol) of 4-(2-sulfatoethylsulfonyl)aniline and 1.6 g (0.02 mol) of 1-methylimidazole were added. The pH was maintained at from 6.2 to 6.5 at about 25° C. with solid sodium bicarbonate. The end of the reaction came after about 7 h. The dye was isolated from the clear blue solution by salting out with potassium chloride. The structure (in the form of the free acid) was found to be approximately as follows:

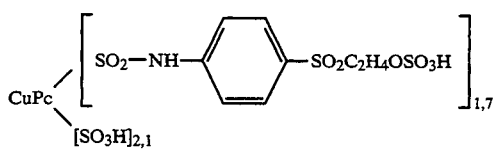

EXAMPLE 4

Example 2 was repeated with 1.2 g (0.01 mol) of 4-dimethylaminopyridine as the catalyst. The resulting structure (in the form of the free acid) was found to be approximately as follows:

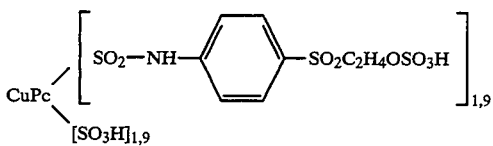

EXAMPLE 5 a) Example 2 was repeated with 1 g (0.01 mol) of dimethyltetrazole as the catalyst. After a reaction time of 8 h the resulting structure (in the form of the free acid) was found to be approximately as follows:

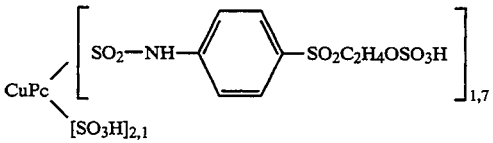

b) After a total reaction time of 22 h the resulting structure was found to be approximately as follows:

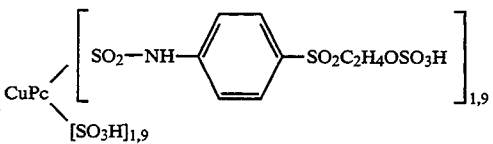

EXAMPLE 6

0.1 mol of copper phthalocyaninesulfonyl chloride (containing about 3.8 sulfonyl chloride groups) in the form of a moist press cake was suspended in 220 ml of water in the presence of a dispersant, 87.3 g (0.3 mol) of 3-(2-sulfatoethyl)aniline and 0.8 g (0.01 mol) of 1-methylimidazole were added, and the pH was maintained at from 6.2 to 6.5 with solid sodium bicarbonate. The end of the reaction came after about 8 h. The structure (in the form of the free acid) was found to be approximately as follows:

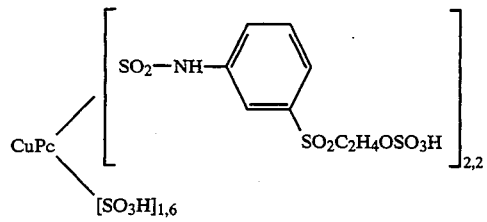

EXAMPLE 7

0.1 mol of copper phthalocyaninesulfonyl chloride (containing about 3.8 sulfonyl chloride groups) in the form of a moist press cake was suspended in 220 ml of water in the presence of a dispersant, 56.5 g (0.2 mol) of 3-(2-sulfatoethyl)aniline, 56.5 g (0.2 mol) of 4-(2-sulfatoethyl)aniline and 0.8 g (0.01 mol) of 1-methylimidazole were added, and the pH was maintained at from 6.2 to 6.5 with solid sodium bicarbonate. The end of the reaction came after about 8 h. The resulting structure (in the form of the free acid) was found to be approximately as follows:

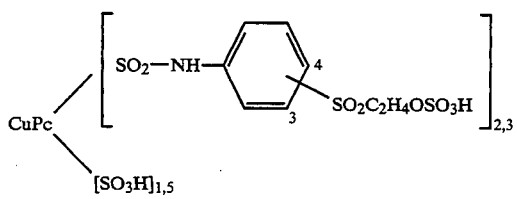

EXAMPLE 8

450 g (1.6 mol) of 4-(2-sulfatoethyl)aniline were introduced into 500 ml of water in the presence of a dispersant and antifoam and a pH of from 6.0 to 6.5 was set with solid sodium bicarbonate. 0.4 mol of copper phthalocyaninesulfonyl chloride (containing about 3.8 sulfonyl chloride groups) in the form of a moist press cake was added, followed by 0.1 mol of 1-methylimidazole. Then solid sodium bicarbonate was added to maintain the pH at from 6.2 to 6.5. The end of the reaction came after 8 h. The dye was isolated from the solution by spray drying. Its structure was found to be approximately as follows:

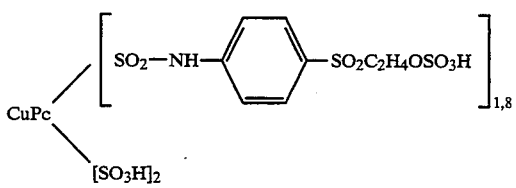

EXAMPLE 9 a) 0.1 mol of copper phthalocyaninesulfonyl chloride (containing about 3.8 sulfonyl chloride grouops) in the form of a moist press cake was suspended in 200 ml of water in the presence of a dispersant, 42.1 g (0.15 mol) of 3-(2-sulfatoethyl)aniline and 0.8 g (0.01 mol) of 1-methylimidazole were added, and a pH of from 6.2 to 6.5 was maintained with solid sodium bicarbonate. After a reaction time of 8 h the resulting structure was found to be approximately as follows:

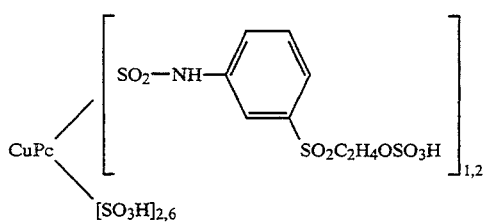

b) After a reaction time of 22 h the resulting structure was found to be approximately as follows:

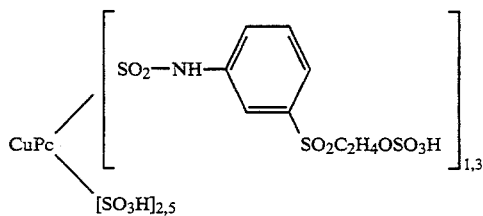

EXAMPLE 10

340 g (1.2 mol) of 4-(2-sulfatoethyl)aniline were introduced into 500 ml of water in the presence of a dispersant and antifoam and a pH of from 6.0 to 6.5 was set with solid sodium bicarbonate. 0.4 mol of copper phthalocyaninesulfonyl chloride (containing about 3.5 sulfonyl chloride groups) as a moist press cake was added, followed by 0.1 mol of 1-methylimidazole. Then solid sodium bicarbonate was added to maintain the pH at from 6.2 to 6.5. The end of the reaction came after 8 h. The dye was isolated from the solution by spray drying. Its structure was found to be approximately as follows:

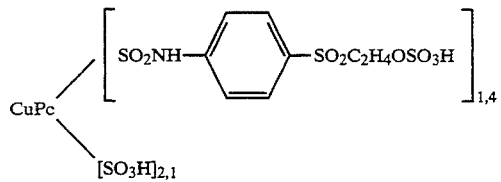

EXAMPLE 11

87.3 g (0.3 mol) of 4-(2-sulfatoethylsulfonyl)aniline were dissolved in 230 ml of water in the presence of a dispersant and antifoam at a pH of from 6.0 to 6.5 by the addition of solid sodium bicarbonate. 0.1 mol of copper phthalocyaninesulfonyl chloride (containing about 3.8 sulfonyl chloride groups) as a moist press cake was added, followed by 4 g (0.05 mol) of 1-methylimidazole. A pH of from 6.2 to 6.6 was maintained with solid sodium bicarbonate. The end of the reaction came after 7 h. The dye was isolated from the solution by spray drying. The structure was found to be approximately as follows:

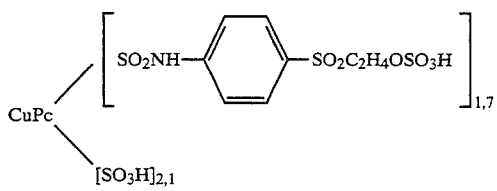

We claim:

1. In a process for preparing reactive metal-free or metal-containing phthalocyanine dyes with one or more ethylsulfonyl groups substituted in the β-position by an alkali-detachable radical or vinylsulfonyl groups as the reactive groups by reacting a metal-free or metal-containing phthalocyaninesulfonyl chloride with primary or secondary amines having one or more ethylsulfonyl groups substituted in the β-position by an alkali-detachable radical or vinylsulfonyl groups and with or without further primary or secondary amines of the aliphatic, aromatic or heterocyclic series in the presence of a catalyst, the improvement which comprises carrying out the reaction in the presence of a catalyst comprising a heterocycle selected from the group consisting of 1-($C_1$-$C_4$-alkyl)imidazoles in which the alkyl group may be $C_1$-$C_4$-alkoxy-substituted, 1-carboxymethylimidazole, 1,2-dimethylimidazole, 1-methylimidazole-5-carboxylic acid, 1-carboxymethyl-1,3,4-triazole and dimethyltetrazole.

2. A process as claimed in claim 1, wherein the reaction is carried out in the presence of a 1-($C_1$-$C_4$-alkyl)imidazole.

3. A process as claimed in claim 1, wherein the reaction is carried out at from 0° to 60° C.

4. A process as claimed in claim 1 for preparing reactive phthalocyanine dyes of the formula I

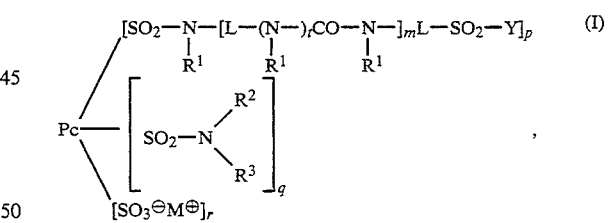

where

Pc is the radical of a metal-free or metal-containing phthalocyanine system which may be substituted by chlorine or phenyl, $R^1$ is hydrogen or $C_1$-$C_6$-alkyl, $R^2$ and $R^3$ are singly and independently of each other hydrogen, $C_1$-$C_6$-alkyl, which may be interrupted by 1 or 2 oxygen atoms in ether function, or phenyl, or together, combined with the nitrogen atom joining them together, a five- or six-membered saturated heterocyclic radical which may contain further hetero atoms, L is $C_2$-$C_4$-alkylene, which may be interrupted by an oxygen atom in ether function, naphthylene or a radical of the formula

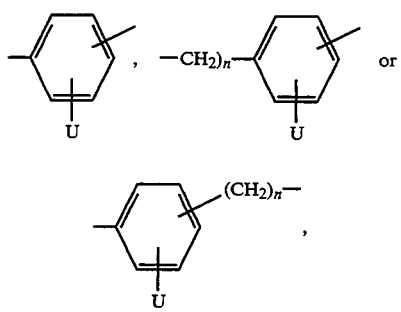

where
- U is hydrogen, hydroxysulfonylmethyl or hydroxysulfonyl and n is 1 or 2,
- Y is vinyl or a radical of the formula $C_2H_4$-Q, where Q is an alkali-detachable group,
- $M^\bullet$ is the equivalent of a cation,
- m is 0 or 1,
- p is from 1 to 3,
- q is from 0 to 3,
- r is from 1 to 3, and
- t is 0 or 1, with the proviso that the sum of p, q and r is not more than 4, wherein a phthalocyaninesulfonyl chloride of the formula II

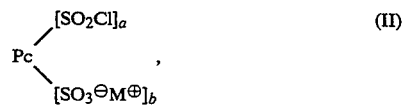

where Pc and $M^\bullet$ are each as defined above, a is from 1 to 4 and b is from 0 to 3, with the proviso that the sum of a and b is not more than 4, or a mixture of phthalocyaninesulfonyl chlorides of the formula II is reacted in an aqueous medium with an amine of the formula III

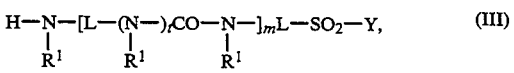

where $R^1$, L, Y, m and t are each as defined above, and with or without an amine of the formula IV

where $R^2$ and $R^3$ are each as defined above, the order of reaction with the amines III and IV being freely choosable.

* * * * *